(12) United States Patent
Martin et al.

(10) Patent No.: US 12,561,070 B2
(45) Date of Patent: Feb. 24, 2026

(54) AUTONOMOUS BATTERY RECHARGE CONTROLLER

(71) Applicant: Dell Products L.P., Hopkinton, MA (US)

(72) Inventors: Owen Martin, Hopedale, MA (US); Ramesh Doddaiah, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 53 days.

(21) Appl. No.: 18/513,710

(22) Filed: Nov. 20, 2023

(65) Prior Publication Data

US 2025/0165156 A1 May 22, 2025

(51) Int. Cl.
| | |
|---|---|
| *G06F 3/00* | (2006.01) |
| *G06F 3/06* | (2006.01) |
| *G06F 12/00* | (2006.01) |

(52) U.S. Cl.
CPC .......... G06F 3/0619 (2013.01); G06F 3/0644 (2013.01); G06F 3/0683 (2013.01)

(58) Field of Classification Search
CPC ..... G06F 3/0619; G06F 3/0644; G06F 3/0683
USPC ........................................................ 711/162
See application file for complete search history.

(56) References Cited

U.S. PATENT DOCUMENTS

| | | | | |
|---|---|---|---|---|
| 6,463,545 B1 * | 10/2002 | Fisher | ..................... | G06F 1/263 |
| | | | | 713/340 |
| 7,395,452 B2 * | 7/2008 | Nicholson | ........... | G06F 12/0804 |
| | | | | 711/E12.04 |
| 9,401,977 B1 * | 7/2016 | Gaw | ....................... | G01N 21/84 |
| 9,450,432 B1 * | 9/2016 | Burns | ................... | H02J 7/0042 |
| 10,180,846 B2 * | 1/2019 | Bohdan | ................. | G06F 9/4406 |
| 10,677,852 B1 * | 6/2020 | Wang | ................... | G01R 31/387 |
| 11,131,717 B1 * | 9/2021 | Fasching | ........... | H01M 10/4228 |
| 11,237,917 B1 * | 2/2022 | Sinha | ........................ | G06F 1/30 |
| 2004/0054851 A1 * | 3/2004 | Acton | ................. | G06F 11/1441 |
| | | | | 711/170 |
| 2005/0117418 A1 * | 6/2005 | Jewell | .................... | G11C 5/141 |
| | | | | 714/E11.138 |
| 2007/0168624 A1 * | 7/2007 | Kaler | .................... | G06F 3/0608 |
| | | | | 711/154 |
| 2008/0238356 A1 * | 10/2008 | Batson | ...................... | H02J 7/04 |
| | | | | 320/103 |

(Continued)

*Primary Examiner* — Sheng Jen Tsai
(74) *Attorney, Agent, or Firm* — Anderson Gorecki LLP

(57) ABSTRACT

In a data storage system, the storage capacity of a partition of volatile memory configured to store write-pending data is only increased after increasing the charge state of a backup power battery to protect the additional storage capacity. A forecast of needed storage capacity is computed for the partition. If the forecast storage capacity is greater than a predetermined percentage of current storage capacity, then the charge state of the battery is increased by a fixed amount relative to full charge. The storage capacity protected by the charge state of the battery inclusive of the charge state increase is computed and the storage capacity of the partition is increased to the computed amount. The charge state of the battery and the storage capacity of the partition are increased iteratively to achieve a target storage capacity such that the forecast storage capacity is not greater than the predetermined percentage of the target storage capacity.

20 Claims, 3 Drawing Sheets

(56) References Cited

U.S. PATENT DOCUMENTS

| | | | | |
|---|---|---|---|---|
| 2010/0320019 | A1* | 12/2010 | Gale | F16H 61/0031 |
| | | | | 417/1 |
| 2011/0062888 | A1* | 3/2011 | Bondy | H05B 45/3725 |
| | | | | 315/294 |
| 2011/0191535 | A1* | 8/2011 | Yuasa | G06F 12/08 |
| | | | | 711/E12.019 |
| 2011/0197036 | A1* | 8/2011 | Ishii | G06F 12/0866 |
| | | | | 711/155 |
| 2011/0208998 | A1* | 8/2011 | Hosaka | G06F 11/1441 |
| | | | | 714/14 |
| 2011/0226539 | A1* | 9/2011 | Huss | B60L 53/80 |
| | | | | 180/65.21 |
| 2012/0246398 | A1* | 9/2012 | Hosaka | G06F 11/1441 |
| | | | | 711/E12.008 |
| 2012/0324274 | A1* | 12/2012 | Hori | G06F 1/30 |
| | | | | 714/6.1 |
| 2013/0097458 | A1* | 4/2013 | Sekino | G06F 11/1441 |
| | | | | 714/E11.138 |
| 2013/0241485 | A1* | 9/2013 | Snyder | B60L 53/64 |
| | | | | 320/109 |
| 2013/0254464 | A1* | 9/2013 | Kimura | G06F 11/1456 |
| | | | | 711/103 |
| 2014/0007135 | A1* | 1/2014 | Yamauchi | G06F 9/4887 |
| | | | | 718/107 |
| 2014/0184172 | A1* | 7/2014 | Momo | B60L 53/12 |
| | | | | 320/160 |
| 2015/0067379 | A1* | 3/2015 | Tashima | G01R 31/392 |
| | | | | 713/340 |
| 2016/0190552 | A1* | 6/2016 | Murata | H01M 4/134 |
| | | | | 429/231.8 |
| 2016/0254698 | A1* | 9/2016 | Anderson | H02J 7/0047 |
| | | | | 320/101 |
| 2016/0266979 | A1* | 9/2016 | Glover | G01R 31/3646 |
| 2016/0342487 | A1* | 11/2016 | Ware | G11C 7/20 |
| 2018/0107596 | A1* | 4/2018 | Kelly | G06F 11/073 |
| 2018/0129604 | A1* | 5/2018 | Kim | G06F 12/0866 |
| 2019/0163628 | A1* | 5/2019 | Wang | G06F 12/0246 |
| 2019/0205042 | A1* | 7/2019 | Kandula | G06F 3/0619 |
| 2019/0307319 | A1* | 10/2019 | Podpolucha | A61B 1/00066 |
| 2020/0177006 | A1* | 6/2020 | Lollo | H02J 7/00047 |
| 2020/0227870 | A1* | 7/2020 | Lollo | H02J 7/00047 |
| 2021/0116984 | A1* | 4/2021 | Chen | G06F 1/3296 |
| 2022/0091941 | A1* | 3/2022 | Sinha | G06F 1/28 |
| 2022/0194236 | A1* | 6/2022 | Whiting | B60L 53/64 |
| 2022/0393490 | A1* | 12/2022 | Lollo | G06F 1/266 |
| 2023/0091553 | A1* | 3/2023 | Kimura | G06F 3/0619 |
| | | | | 711/162 |
| 2023/0325325 | A1* | 10/2023 | Wang | G06F 12/12 |
| | | | | 711/122 |
| 2023/0361573 | A1* | 11/2023 | Bangalore | B60L 58/12 |
| 2024/0214841 | A1* | 6/2024 | Nocete | H04W 16/32 |
| 2024/0346914 | A1* | 10/2024 | Wright | G08B 19/00 |

* cited by examiner

AUTONOMOUS BATTERY RECHARGE CONTROLLER

TECHNICAL FIELD

The subject matter of this disclosure is generally related to data storage systems.

BACKGROUND

Electronic data storage is a critical infrastructure for organizational processes that rely on computers. A typical datacenter includes clusters of server computers and multiple data storage nodes that are interconnected via network switches. The servers run instances of host applications that support organizational processes such as email, accounting, inventory control, e-business, and engineering. Host application data is maintained by the storage nodes. The data storage nodes may include, or be part of, storage arrays, storage area networks (SANs), and network-attached storage (NAS), for example, and without limitation. Such data storage systems include extensive processing, memory, and storage resources that can consume a significant amount of electrical power. In the event of an unplanned shutdown associated with loss of line power, write-pending host application data that resides only in volatile memory is potentially vulnerable to loss. Batteries are maintained to provide backup power to copy the write-pending data from volatile memory to non-volatile storage in a process known as "vaulting." Battery capacity may be selected to support back-to-back vaulting of a theoretical maximum amount of potentially write-pending data.

SUMMARY

Some aspects of the present disclosure are predicated in-part on recognition that existing backup power practices can shorten battery life or leave write-pending data temporarily vulnerable to loss. The storage capacity of the batteries that provide backup power for a data storage system is typically selected based on the maximum possible amount of write-pending data that could need to be vaulted twice in rapid succession in the event of repeated loss of line power. The backup batteries can be maintained at full charge so that maximum power is available for emergency vaulting operations, but that configuration is problematic because the service life of various types of batteries, including the lithium-ion batteries typically used by data storage systems for backup power, is shortened by constantly maintaining the batteries at full charge. The batteries typically do not have to be maintained at full charge because the amount of write-pending data in volatile memory that could require vaulting is typically less than the maximum possible amount, so the battery charge state can be set relative to the amount of write-pending data in volatile memory. However, the amount of write-pending data in volatile memory tends to increase faster than a battery can be charged to protect that data so some data can be temporarily unprotected while the battery is being charged to match the increased amount of write-pending data.

A method in accordance with some embodiments comprises: computing that demand on storage capacity of a partition of volatile memory of a data storage system will increase; increasing charge state of a battery configured to provide backup power for vaulting data stored in the partition; and increasing the storage capacity of the partition only after increasing the charge state of the battery that provides backup power for vaulting data stored in the partition to a charge level capable of vaulting all data addresses of the partition inclusive of the increased storage capacity.

An apparatus in accordance with some embodiments comprises: a storage system comprising at least one compute node configured to manage access to at least one non-volatile drive, the compute node comprising hardware resources including multi-core processors and volatile memory, the volatile memory comprising a partition configured to store write-pending data; and a controller adapted to: compute that demand on storage capacity of the partition of volatile memory will increase; increase charge state of a battery configured to provide backup power for vaulting data stored in the partition; and increase the storage capacity of the partition only after increasing the charge state of the battery that provides backup power for vaulting data stored in the partition to a charge level capable of vaulting all data addresses of the partition inclusive of the increased storage capacity.

In accordance with some embodiments, a non-transitory computer-readable storage medium stores instructions that when executed by a computer perform a method comprising: computing that demand on storage capacity of a partition of volatile memory of a data storage system will increase; increasing charge state of a battery configured to provide backup power for vaulting data stored in the partition; and increasing the storage capacity of the partition only after increasing the charge state of the battery that provides backup power for vaulting data stored in the partition to a charge level capable of vaulting all data addresses of the partition inclusive of the increased storage capacity.

This summary is not intended to limit the scope of the claims or the disclosure. All examples, embodiments, aspects, implementations, and features can be combined in any technically possible way. Method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features such as, for example, and without limitation, tangible features. The term "physical" refers to tangible features that possibly include, but are not limited to, electronic hardware. For example, multiple virtual computers could operate simultaneously on one physical computer. The term "logic," if used, refers to special purpose physical circuit elements, firmware, software, computer instructions that are stored on a non-transitory computer-readable medium and implemented by multi-purpose tangible processors, and any combinations thereof. Embodiments are described in the context of a data storage system that includes host servers and storage arrays. Such embodiments are not limiting.

Some embodiments, aspects, features, and implementations include machines such as computers, electronic components, optical components, and processes such as computer-implemented procedures and steps. The computer-implemented procedures and steps are stored as computer-executable instructions on a non-transitory computer-readable medium. The computer-executable instructions may be executed on a variety of tangible processor devices, i.e., physical hardware. For practical reasons, not every step, device, and component that may be part of a computer or data storage system is described herein. Those steps, devices, and components are part of the knowledge generally available to those of ordinary skill in the art. The corresponding systems, apparatus, and methods are therefore enabled and within the scope of the disclosure.

Figure 1:
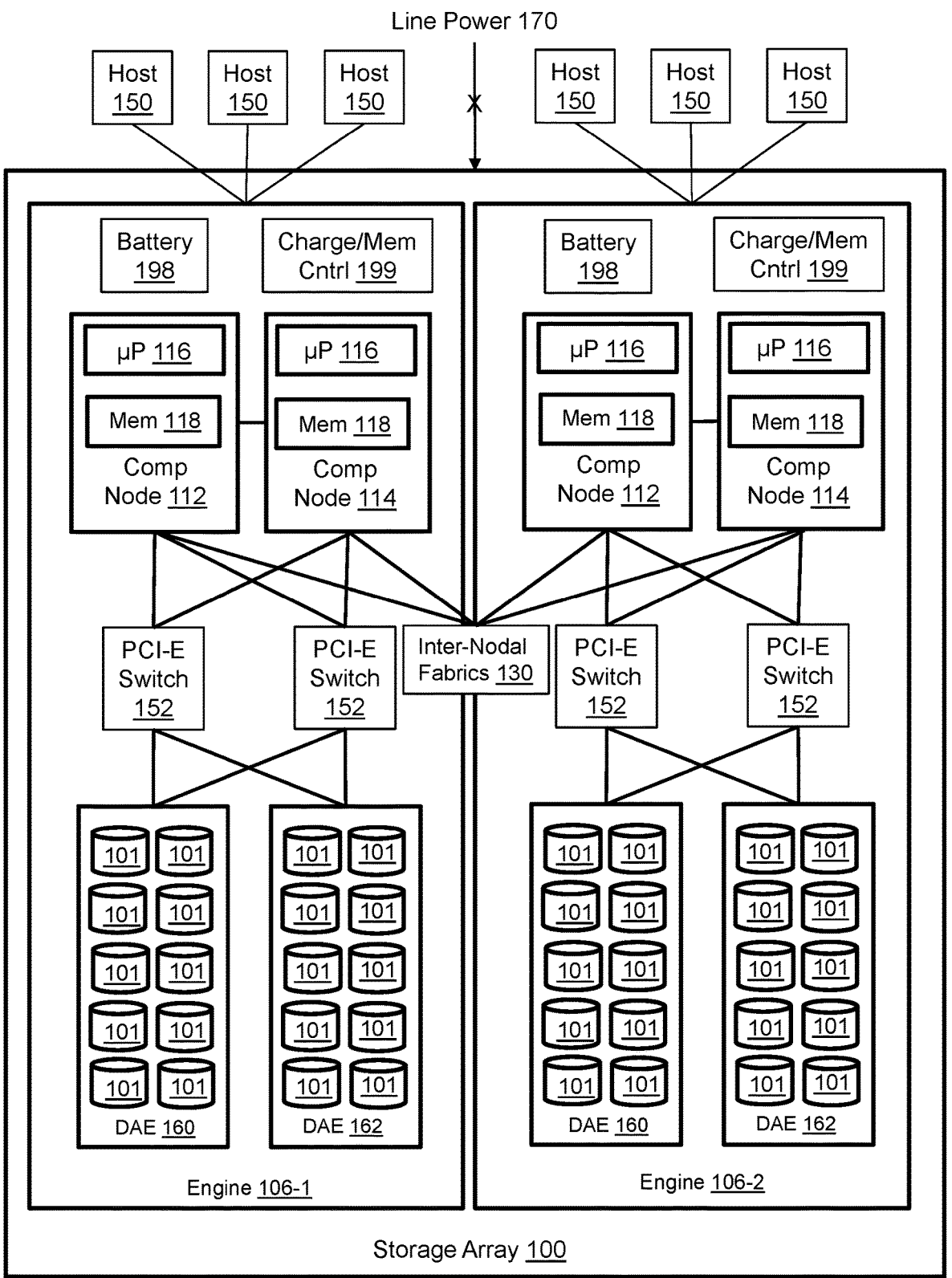
FIG. 1 illustrates a storage system with autonomous battery charge controllers that couple volatile mirrored memory partition resizing with battery charge state adjustments.

FIG. 1 illustrates a storage system with autonomous battery charge controllers 199 that couple volatile mirrored memory partition resizing to backup battery charge state adjustments. Increases in the amount of volatile memory allocated for storage of write-pending data are linked to increases in backup battery charge state such that the storage system maintains enough backup power to vault all write-pending data at all times during expansion of the mirrored memory partition. The specifically illustrated storage system is a storage array 100, but other types of storage systems could be used with autonomous battery charge controllers 199. Storage array 100 is shown with two engines 106-1, 106-2, but might include any number of engines. Each engine includes a backup power battery 198, battery charge controller 199, disk array enclosures (DAEs) 160, 162 and a pair of peripheral component interconnect express (PCI-E) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. The backup battery 198 may be any type of battery, e.g., lithium-ion, and may be sized such that it has enough storage capacity to vault the maximum amount of write-pending data that could be present in volatile memory 118. Each compute node is implemented as a separate printed circuit board (PCB) and includes resources such as multi-core processors 116 and local memory IC chips that provide volatile memory 118 that can be powered from line power or the backup battery. Processors 116 may include central processing units (CPUs), graphics processing units (GPUs), or both. The local memory 118 is volatile storage media of any type, e.g., dynamic random-access memory (DRAM). Each compute node includes one or more adapters and ports for communicating with host servers 150 to service IOs from the host servers. Each compute node also includes one or more adapters for communicating with other compute nodes via redundant inter-nodal channel-based InfiniBand fabrics 130. The battery charge controllers 199 may include software stored on the managed drives and memory, software running on the processors, hardware, firmware, and any combinations thereof.

Figure 2:
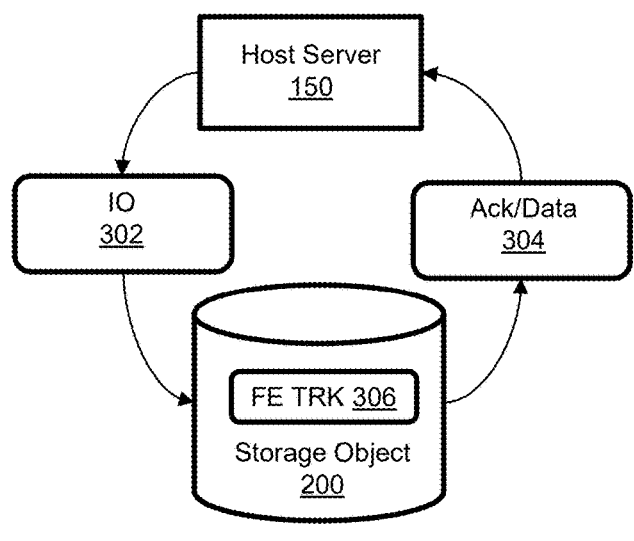
FIG. 2 illustrates volatile memory partitions and segments.
Figure 2:
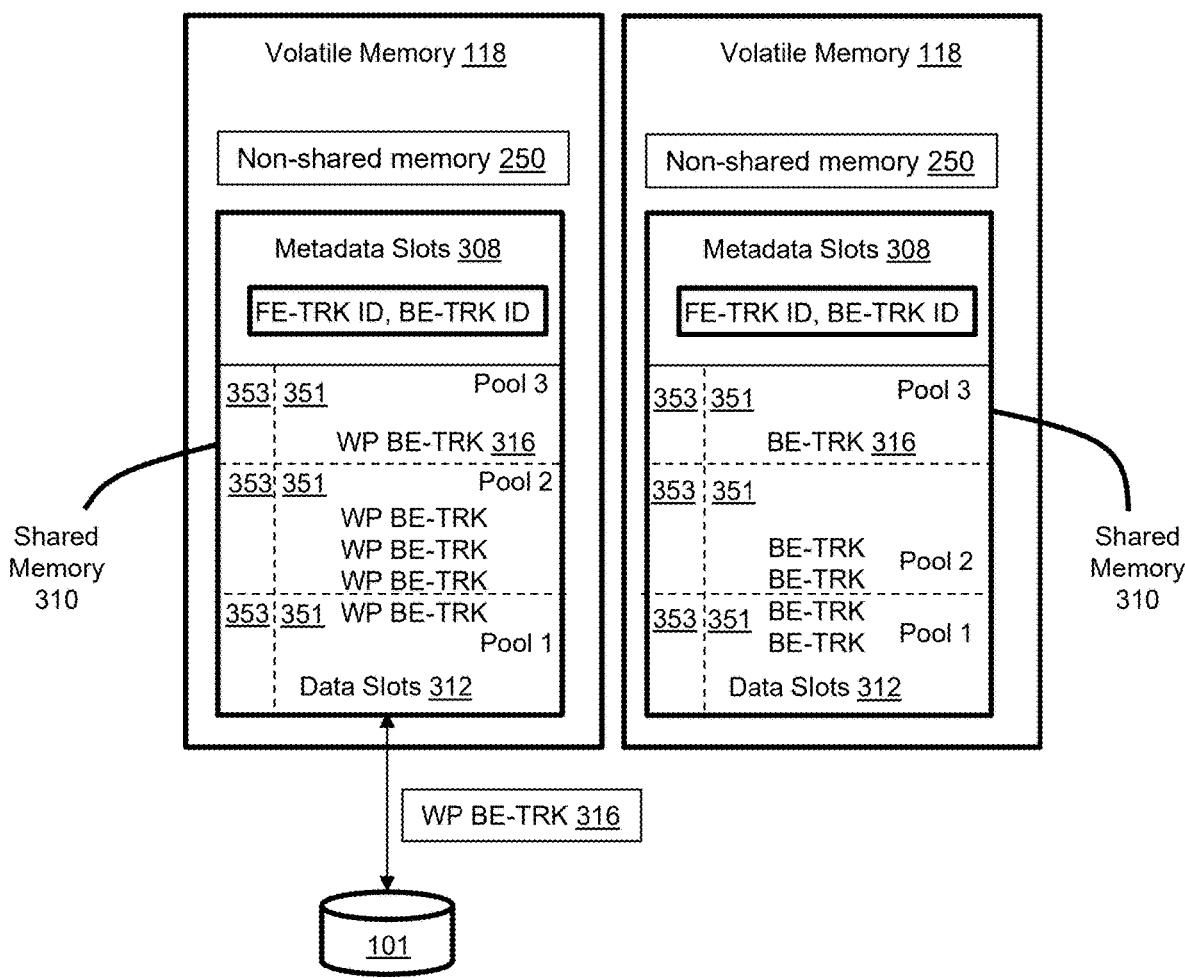

Referring to FIGS. 1 and 2, host application data is persistently stored on the managed drives 101 and, because the managed drives are not discoverable by the host servers 150, logically stored on a storage object 200 that can be discovered by the host servers. Without limitation, a storage object may be referred to as a volume, device, or LUN, where a logical unit number (LUN) is a number used to identify logical storage volumes in accordance with the small computer system interface (SCSI) protocol. From the perspective of the host servers 150, the storage object 200 is a single disk having a set of contiguous logical block addresses (LBAs) on which data used by the instances of a host application resides. However, the host application data is stored at non-contiguous addresses on various managed drives 101. There may be a large number of host servers and the storage array may maintain a large number of storage objects.

Each compute node 112, 114 allocates a fixed amount of its local volatile memory 118 to a shared memory partition 310 that can be accessed by all compute nodes of the storage array using direct memory access (DMA). The remaining capacity of the volatile memory 118 is maintained as a non-shared memory partition 250. The shared memory 310 includes metadata slots 308 and data slots 312, each of which is a fixed allocation of the shared memory 310. The basic allocation units of storage capacity that are used by the compute nodes to access the managed drives are back-end tracks (BE-TRKs). The host application data is logically stored in front-end tracks (FE-TRKs) on the production storage object 200 and actually stored on BE-TRKs on the managed drives 101. The FE-TRKs are mapped to the BE-TRKs and vice versa by FE-TRK IDs and BE-TRK IDs, which are pointers that are maintained in metadata slots 308. More specifically, the BE-TRK IDs are pointers to BE-TRKs of host application data in the data slots. The data slots 312, which function to hold data for processing IOs, are divided into a mirrored segment 351 and a non-mirrored segment 353. The mirrored segment is mirrored by both compute nodes 112, 114 of an engine, whereas the non-mirrored segment is not mirrored. Each segment may be divided into a plurality of pools (e.g., pool 1, pool 2, pool 3). The sizes of the data slots correspond to the sizes of the BE-TRKs and the terms data slot and BR-TRK maybe used interchangeably when referring to partition and segment allocations. Each pool (partition) contains same-size data slots for holding BE-TRK data, and the sizes of the data slots/BE-TRKs differs between pools. For example, and without limitation, pool 1 may contain only 16 KB data slots, pool 2 may contain only 64 data slots, and pool 3 may contain only 128 KB data slots.

The shared memory 310 is used to service IOs from the host servers 150, with the pools being used selectively to reduce wasted space. In the illustrated example, compute node 112 receives an IO 302 from host 150 with storage object 200 as the target. IO 302 could be a Read or Write command for a FE-TRK 306 that is logically stored on the storage object 200. A response to a Write IO is an Ack, whereas a response to a Read IO is data. The response is collectively represented as Ack/Data 304. The compute node 112 uses information in the IO to identify a metadata page corresponding to FE-TRK 306, e.g., by inputting information such as the storage object ID and LBAs into a hash table. The hash table indicates the location of the corresponding metadata page in metadata slots 308. The location of the metadata page in the shared memory may be local or remote relative to compute node 112. A BE-TRK ID pointer from that metadata page is obtained and used by the compute node 112 to find the corresponding data slot that contains BE-TRK 316 which is associated with FE-TRK 306. The BE-TRK 316 is not necessarily present in the data slots when the IO 302 is received because the managed drives 101 have much greater storage capacity than the data slots so data slots are routinely recycled to create free data slots.

If the IO 302 is a Read and the corresponding BE-TRK 316 is not present in the data slots, which is known as a "cache miss," then the compute node 112 locates and retrieves a copy of BE-TRK 316 from the managed drives 101. More specifically, the BE-TRK 316 is copied into an empty data slot in the pool with the closest sized data slots that are ≥BE-TRK 316 size in the non-mirrored segment 353. That copy is then used to respond to the host server and the data is eventually flushed from the data slots. Read data can safely be placed in the non-mirrored segment 353 because it is persistently stored on the managed drives and thus non-vulnerable to loss due to interruption of line power.

If the IO 302 is a Write and the corresponding BE-TRK 316 is not present in the data slots, then the compute node 112 places the Write data into an empty data slot in the pool with the closest sized data slots that are ≥BE-TRK 316 size in the mirrored segment 351 and marks that data slot as write-pending (WP). In accordance with mirroring, the data is copied to the corresponding mirrored segment and pool of compute node 114, thereby protecting the data from failure of compute node 112. Worker threads 360 running in the background eventually destage the WP slot data to BE-TRK 316 on the managed drives, e.g., overwriting the stale data on the managed drives and flushing the data from the data slots, after which the WP can be cleared. During the period of time when slot data is marked WP and only exists in the mirrored segment of shared memory, that data is potentially vulnerable to loss in the event of line power 170 failure because the shared memory is volatile memory and both compute nodes rely on the same line power. Batteries 198 exist to provide backup power to destage the WP data in the mirrored memory to the managed drives in response to loss of line power in a procedure known as vaulting. The data need only be vaulted from one of the mirrored memory segments.

Although the sizes of the non-shared memory 250, shared memory 310, non-mirrored segment 353, and mirrored segment 351 are fixed, those fixed sizes may be adjusted at different points in time during operation based on changing workloads and a variety of other factors. For example, if the Read:Write ratio being service by the storage array decreases, then the size of the mirrored memory segment may be increased by reallocating slots from the non-mirrored memory segment to the mirrored memory segment, increasing the size of the shared memory partition and allocating more memory addresses to the mirrored segment 351, or both. The charge controller 199 sets the target charge state of the battery 198 to maintain only enough backup power to protect the mirrored segment 351, e.g., enough backup power to vault all addresses in mirrored segment 351 once or twice in rapid succession, possibly with some reserve power. The capacity of battery 198 may be selected based on the maximum possible size of the mirrored segment 351, so allocating an amount of memory less than the maximum possible to mirrored segment 351 results in battery 198 being at less than full charge, which is desirable for battery service life longevity. However, the size of the mirrored segment and the amount of data in the mirrored segment may increase much faster than the charge state of the battery can be increased. The lag between battery charge rate and WP data accumulation is potentially problematic because WP data can be temporarily vulnerable to loss while the battery is being charged to the target charge state, and rate of charge tends to decrease as batteries age. Consequently, the charge controller 199 limits the timing of expansion of the size of the mirrored segment 351 based on the actual charge state of battery 198, e.g., only allowing an increase in the size of the mirrored segment 351 when the battery 198 charge state capable of protecting the larger size of the mirrored segment has been achieved. In order to avoid lengthy delays in increasing the size of the mirrored segment 351 by a large amount, which could result in undesirable memory resource starvation, the size of the mirrored segment and charge state of the battery may be increased to reach the target charge state in multiple discrete steps as will be explained below.

Figure 3:
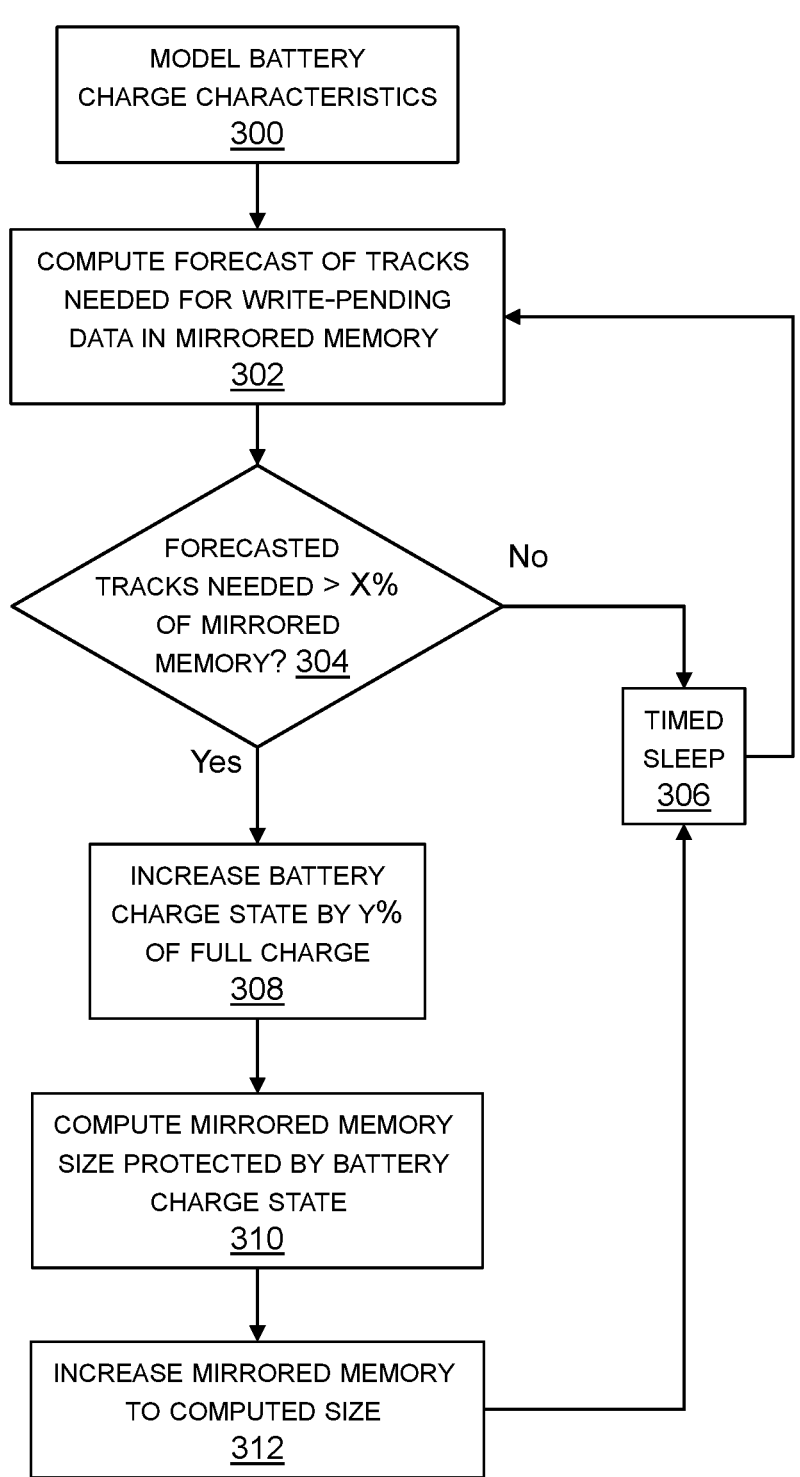
FIG. 3 illustrates a method for coupling volatile mirrored memory partition resizing to battery charge state adjustments.

FIG. 3 illustrates a method for coupling volatile mirrored memory partition size to battery charge state. The method may be implemented independently within the protection domain of each battery, e.g., each engine. The battery charge characteristics are modeled as indicated in step 300. Battery charge state, which may be represented as % charge relative to full charge or amp-hours, for example, does not typically increase linearly. Batteries can be charged in multiple stages, e.g., constant current, constant voltage, and float, and the rate of charge may differ between stages. Moreover, charge rate within a stage may be non-linear, and be dependent on battery age, rated service life, time spent at full charge, cell voltage, and other factors. Step 302 is computing a forecast of tracks needed for write-pending data in mirrored volatile memory. Any of a wide variety of known techniques can be used to compute such forecasts. Step 304 is computing whether the forecasted number of tracks needed for write-pending data in mirrored volatile memory exceeds X % of the number of tracks currently in mirrored volatile memory. The value of X could be 80, for example, and without limitation. If the forecasted number of tracks needed for write-pending data in mirrored volatile memory does not exceed X % of the number of tracks currently in mirrored volatile memory, then no action is required, and the process iterates after a timed sleep period as indicated in step 306. If the forecasted number of tracks needed for write-pending data in mirrored volatile memory does exceed X % of the number of tracks currently in mirrored volatile memory, then the battery charge state is increased by Y % of full charge as indicated in step 308. The value of Y may be 10, for example and without limitation. Step 310 is computing the mirrored memory size that is protected by the battery charge state, i.e., original charge state plus Y %. Protection may be characterized in any of a variety of ways, e.g., single instance vaulting or back-to-back vaulting in rapid succession. Step 312 is increasing the size of the mirrored memory to the protected size computed in step 310. The size of the mirrored memory is only increased after the battery charge state increase has been completed. The process iterates after a timed sleep period as indicated in step 306. As a result, mirrored memory size is increased in lock-step with battery charge state, thereby maintaining vaulting protection during increases in the size of the mirrored memory. Moreover, the step-size can be selected by setting the value of Y so that a target size of mirrored memory size relative to the forecast is reached in multiple steps, thereby avoiding delay in increasing the size of the mirrored memory until the battery is charged to match the target size of the mirrored memory. Further, the value of Y may be computed and updated based on the modeled battery charge characteristics, e.g., such that Y corresponds to a target period of time.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method for improving service life of a battery that provides backup power for a data storage system, comprising:

adjusting charge state of the battery in response to changing data protection needs to maintain the battery in a partial charge state by:

charging the battery to a first partial charge state that is less than full charge, where full charge is maximum storage capacity of the battery and maximum storage capacity of the battery is selected to be sufficient to protect a maximum possible size of a partition of volatile memory of the data storage system and the first partial charge state is insufficient to protect the partition and is sufficient to protect data in a mirrored memory segment of the partition;

computing that demand on storage capacity of the mirrored memory segment of the partition of volatile memory of the data storage system will not increase;

responsive to computing that demand on storage capacity of the partition will not increase, a charge controller holding the first partial charge state of the battery constant while line power is available such that the battery does not reach full charge;

computing that demand on storage capacity of the mirrored memory segment of the partition of volatile memory of the data storage system will increase by an amount;

responsive to computing that demand on storage capacity of the partition will increase by the amount, and without increasing the storage capacity of the partition, further charging the battery to a second partial charge state that is insufficient to protect the partition and is sufficient to protect data in the mirrored memory segment of the partition inclusive of the increased amount, the second partial charge state of the battery being held constant by the charge controller while line power is available such that the battery does not reach full charge; and increasing the storage capacity of the mirrored memory segment of the partition only after increasing the charge state of the battery that provides backup power for vaulting data stored in the partition to the second partial charge state.

2. The method of claim 1 further comprising computing a forecast of storage capacity that will be needed for write-pending data in the partition.

3. The method of claim 2 further comprising computing that the forecast storage capacity is greater than a predetermined percentage of current storage capacity of the partition.

4. The method of claim 3 further comprising increasing charge state of the battery by a fixed amount relative to full charge.

5. The method of claim 4 further comprising computing a storage capacity protected by the charge state of the battery inclusive of the charge state increase.

6. The method of claim 5 further comprising increasing the storage capacity of the partition to the computed amount, where the current storage capacity increased by the computed amount is less than the forecast storage capacity.

7. The method of claim 6 further comprising iteratively increasing the charge state of the battery and the storage capacity of the partition to achieve a target storage capacity such that the forecast storage capacity is not greater than the predetermined percentage of the target storage capacity.

8. An apparatus comprising:

a storage system comprising at least one compute node configured to manage access to at least one non-volatile drive, the compute node comprising hardware resources including multi-core processors and volatile memory, the volatile memory comprising a partition configured to store write-pending data; and a controller adapted to improve service life of a battery that provides backup power for the data storage system by adjusting charge state of the battery in response to changing data protection needs to maintain the battery in a partial charge state, the controller configured to:

charge the battery to a first partial charge state that is less than full charge, where full charge is maximum storage capacity of the battery and maximum storage capacity of the battery is selected to be sufficient to protect a maximum possible size of a partition of the volatile memory and the first partial charge state is insufficient to protect the partition and is sufficient to protect data in a mirrored memory segment of the partition;

compute that demand on storage capacity of the mirrored memory segment of the partition of volatile memory of the data storage system will not increase;

responsive to computing that demand on storage capacity of the partition will not increase, hold the first partial charge state of the battery constant while line power is available such that the battery does not reach full charge;

compute that demand on storage capacity of the partition of volatile memory will increase by an amount;

responsive to computing that demand on storage capacity of the partition will increase by the amount, and without increasing the storage capacity of the partition, further charge the battery to a second partial charge state that is insufficient to protect the partition and is sufficient to protect data in the mirrored memory segment of the partition inclusive of the increased amount, the second partial charge state of the battery being held constant by the charge controller while line power is available such that the battery does not reach full charge; and increase the storage capacity of the mirrored memory segment of the partition only after increasing the charge state of the battery that provides backup power for vaulting data stored in the partition to the second partial charge state.

9. The apparatus of claim 8 further comprising the controller adapted to compute a forecast of storage capacity that will be needed for write-pending data in the partition.

10. The apparatus of claim 9 further comprising the controller adapted to compute that the forecast storage capacity is greater than a predetermined percentage of current storage capacity of the partition.

11. The apparatus of claim 10 further comprising the controller adapted to increase charge state of the battery by a fixed amount relative to full charge.

12. The apparatus of claim 10 further comprising the controller adapted to compute a storage capacity protected by the charge state of the battery inclusive of the charge state increase.

13. The apparatus of claim 12 further comprising the controller adapted to increase the storage capacity of the partition to the computed amount, where the current storage capacity increased by the computed amount is less than the forecast storage capacity.

14. The apparatus of claim 13 further comprising the controller adapted to iteratively increase the charge state of the battery and the storage capacity of the partition to achieve a target storage capacity such that the forecast storage capacity is not greater than the predetermined percentage of the target storage capacity.

15. A non-transitory computer-readable storage medium storing instructions that when executed by a computer perform a method for improving service life of a battery that provides backup power for a data storage system, the method comprising:

adjusting charge state of the battery in response to changing data protection needs to maintain the battery in a partial charge state by:

charging the battery to a first partial charge state that is less than full charge, where full charge is maximum storage capacity of the battery and maximum storage capacity of the battery is selected to be sufficient to protect a maximum possible size of a partition of volatile memory of the data storage system and the first partial charge state is insufficient to protect the partition and is sufficient to protect data in a mirrored memory segment of the partition;

computing that demand on storage capacity of the mirrored memory segment of the partition of volatile memory of the data storage system will not increase;

responsive to computing that demand on storage capacity of the partition will not increase, a charge controller holding the first partial charge state of the battery constant while line power is available such that the battery does not reach full charge;

computing that demand on storage capacity of the mirrored memory segment of the partition of volatile memory of the data storage system will increase by an amount;

responsive to computing that demand on storage capacity of the partition will increase by the amount, and without increasing the storage capacity of the partition, further charging the battery to a second partial charge state that is insufficient to protect the partition and is sufficient to protect data in the mirrored memory segment of the partition inclusive of the increased amount, the second partial charge state of the battery being held constant by the charge controller while line power is available such that the battery does not reach full charge; and increasing the storage capacity of the mirrored memory segment of the partition only after increasing the charge state of the battery that provides backup power for vaulting data stored in the partition to the second partial charge state.

16. The non-transitory computer-readable storage medium of claim 15 in which the method further comprises computing a forecast of storage capacity that will be needed for write-pending data in the partition.

17. The non-transitory computer-readable storage medium of claim 16 in which the method further comprises computing that the forecast storage capacity is greater than a predetermined percentage of current storage capacity of the partition.

18. The non-transitory computer-readable storage medium of claim 17 in which the method further comprises increasing charge state of the battery by a fixed amount relative to full charge.

19. The non-transitory computer-readable storage medium of claim 18 in which the method further comprises computing a storage capacity protected by the charge state of the battery inclusive of the charge state increase.

20. The non-transitory computer-readable storage medium of claim 19 in which the method further comprises increasing the storage capacity of the partition to the computed amount, where the current storage capacity increased by the computed amount is less than the forecast storage capacity.

* * * * *